United States Patent
Orlando, Jr.

(10) Patent No.: US 6,345,423 B1
(45) Date of Patent: Feb. 12, 2002

(54) LOCKING RING ANVIL

(76) Inventor: Anthony Orlando, Jr., 318 Orchard Rd., Highland, NY (US) 12528

( * ) Notice: Subject to any disclaimer, the term of this patent is extended or adjusted under 35 U.S.C. 154(b) by 0 days.

(21) Appl. No.: 09/523,696

(22) Filed: Mar. 13, 2000

Related U.S. Application Data

(60) Provisional application No. 60/124,874, filed on Mar. 17, 1999.

(51) Int. Cl.⁷ ............................................. B23P 13/00
(52) U.S. Cl. ......................................................... 29/8
(58) Field of Search ...................... 29/8; 72/377; 249/57

(56) References Cited

U.S. PATENT DOCUMENTS

| | | |
|---|---|---|
| 455,430 A | 7/1891 | Peckham |
| 1,662,631 A | 3/1928 | Blois |
| 1,830,235 A | 11/1931 | Mazer |
| 2,022,737 A | 12/1935 | Rathbun ........................... 29/8 |
| 2,285,459 A | 6/1942 | Pratt ................................. 29/8 |
| 2,558,271 A | 6/1951 | Rothenberg ....................... 29/8 |
| 2,600,163 A | * 6/1952 | Henry ............................... 29/8 |
| 4,785,647 A | 11/1988 | Coleman ......................... 72/74 |
| 4,790,166 A | 12/1988 | Kaar ............................. 72/106 |

OTHER PUBLICATIONS

Three Pages—Two Sides Each Of Catalogue Pages Showing Tools for Use with Rings Which Tools are Currently Available.

* cited by examiner

*Primary Examiner*—P. W. Echols

(57) ABSTRACT

The locking ring anvil has a frame assembly and a means for mounting the frame assembly, a pivot assembly is mounted on the frame assembly. A barrel and arbor assembly is mounted on the pivot assembly. The pivot assembly includes means for retaining the barrel and arbor assembly in a fixed position and for rotating the barrel and arbor assembly about a semicircle. The barrel and arbor assembly also include a tapered arbor and a barrel and a means for mounting the barrel about the tapered arbor. The barrel may be rotated about the arbor and moves back and forth on the tapered arbor.

14 Claims, 5 Drawing Sheets

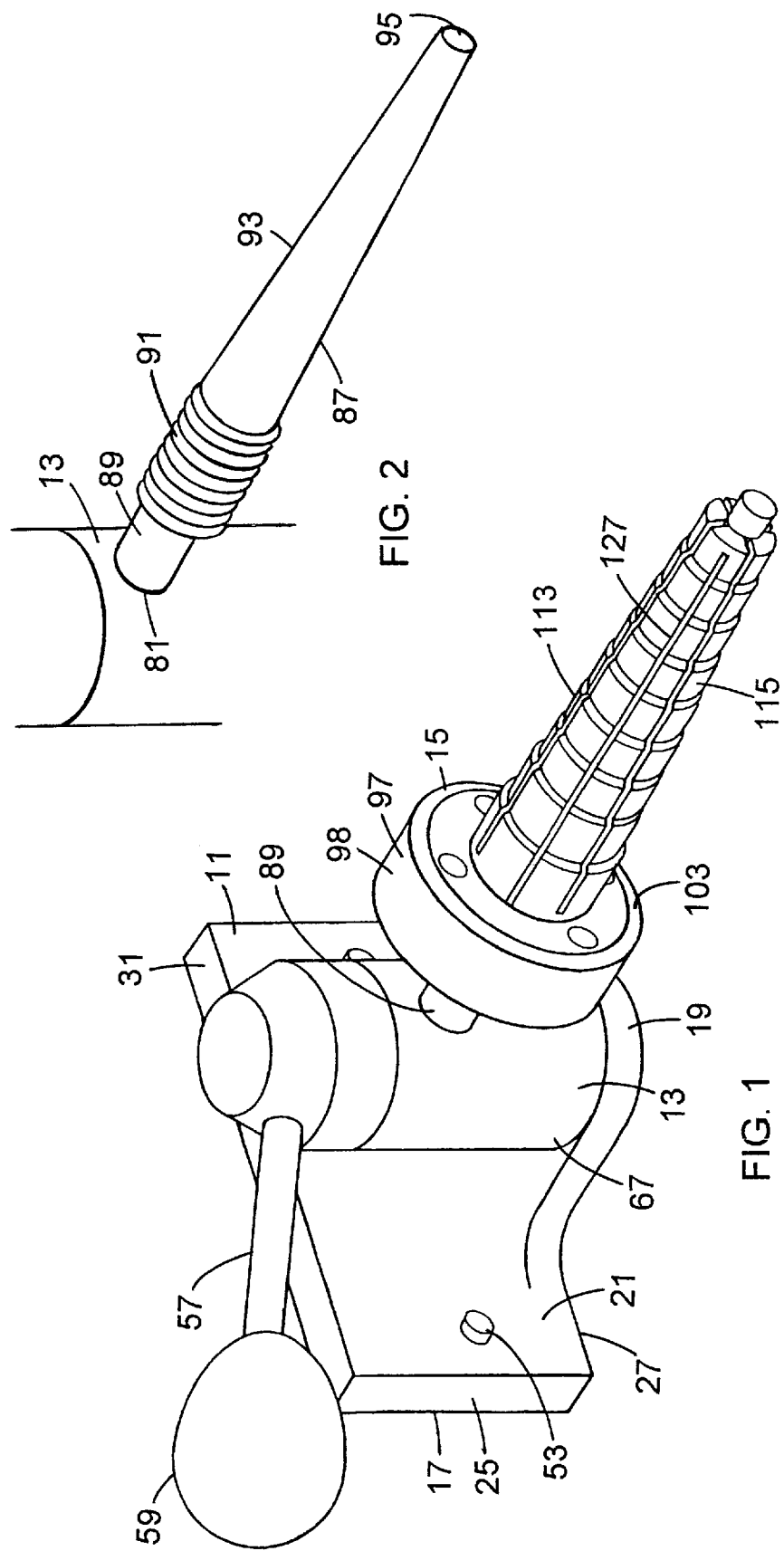

LOCKING RING ANVIL

RELATED APPLICATIONS

This application claims the benefit under Title 35, United States Code, section 119(e) of United States Provisional Application, Serial No. 60/124,874 filed Mar. 17, 1999. Such Provisional Specification Serial No. 60/124,874 is hereby incorporated by reference in its entirety into this Application.

BACKGROUND OF THE INVENTION

1. Field of the Invention

This invention pertains to a locking ring anvil for producing and repairing rings and more particularly to a locking ring anvil for readily securing a ring in a wide variety of positions so as effectively to permit the performance of a wide variety of procedures.

As an example, when setting a stone, such as a diamond, the prongs used to hold the diamond are not equally accessible from any one position. When work is being performed, it is also essential that the ring be secure and not move as a result of the work being performed. Although jewelry work is best described as light, it is required at times to hammer and a hard resistant surface is required along with stability.

2. Prior Art and Objects

The equipment that is currently available for holding a ring during construction and repair fails to provide the rigidness, security, flexibility and accessibility to all points of procedure that is needed.

Devices have been provided for the enlargement of rings. Two categories of devices for ring enlargement have been produced, namely, those that stretch a solid or continuous band and those that enlarge a ring with a setting.

In the latter situation where there is a setting expanding about the circumference of the ring, expansion will cause the ring to break at the fusion joints connecting the band to the setting. Therefore, it is necessary to roll back and forth only on that portion of the band opposite from the setting. Examples of such devices can be found in the Blois Patent, U.S. Pat. No. 1,662,631 and in the Coleman Patent, U.S. Pat. No. 4,785,647. These devices have no relationship to this invention.

Where a continuous band is stretched, as for example, the stretching of wedding band having no setting, it is known to stretch the ring using an expanding barrel to force outwardly within the interior circumference of the ring to enlarge it. Examples of such ring expanders that use an expanding barrel can be found in the following U.S. patents:

| PATENTEE | U.S. Pat. No. |
| --- | --- |
| Mazer | 1,830,235 |
| Rathburn | 2,022,737 |
| Pratt | 2,285,459 |
| Rothenberg | 2,558,271 |

Each of these four patents uses an expanding barrel having slots but with variations as to the arrangement of the slots. In all of these devices, the barrel is secured against rotation and an arbor is forced into the barrel to expand the barrel. The Rathburn patent teaches a hand held device where an arbor is hammered into the barrel from the small diameter end toward the larger diameter end. The other patents, which describe bench top mounted devices, an arbor is forced into the barrel from the larger end of the barrel. In some of the patents listed above, springs are used to contract the barrel when the arbor is withdrawn. In these devices, a ring is placed on the barrel to obtain a snug but accessible fit and the arbor is then forced into the barrel, causing the barrel to expand and thereby expanding the ring.

The ring expanders using a barrel provide an apparatus that, just before expansion occurs, will grip a ring, but such devices offer nothing to move a ring to an optimum position for work. The expanders are also designed for force and therefore could easily damage a ring being held by the barrel. A device which is used for repairing rings must be capable of holding more than continuous bands, and most importantly rings with settings, and must be capable of securing the ring in a wide variety of positions without harm to the ring.

It is therefore an object of this invention to provide a locking ring anvil to secure a ring for the purpose of readily and efficiently working on the ring and while being sufficiently sturdy to withstand operations such as hammering.

Another object is to provide a locking ring anvil that can position a ring in a wide variety of positions.

Still another object is to provide a locking ring anvil that can be mounted for optimum accessibility by a jeweler.

A further object is to provide a locking ring anvil which is economical to manufacture, durable, easily utilized and which can be installed at a work station when needed and then be removed and stored when not in use.

These and other objects of the present invention will be apparent to those skilled in the art.

SUMMARY OF THE INVENTION

The locking ring anvil of the present invention includes a frame, a pivoting assembly and barrel and arbor assembly. The frame includes a means for being mounted at a work station. The pivot assembly is mounted on the frame and includes a pivoting section and a clamping hub which holds the pivot member in various selected positions. The barrel and arbor assembly includes an arbor shaft and a barrel slotted to permit expansion and contraction of the barrel. The arbor shaft includes a mounting shank which is secured to the pivot member and the arbor shaft further includes a tapered arbor and an arbor thread located between the tapered arbor and the mounting shank. An adjustment nut is mounted on the arbor thread and the barrel is mounted on the adjustment nut so as to rotate in relationship to the adjustment nut. Turning of the adjustment nut moves the barrel back and forth over the tapered arbor.

BRIEF DESCRIPTION OF THE DRAWINGS

FIG. 1 is a pictorial view of the locking ring anvil showing the barrel, the pivoting assembly and the frame.

FIG. 2 is a pictorial view of the arbor shaft mounted in the pivoting assembly.

DESCRIPTION OF THE PREFERRED EMBODIMENT

Figure 3:
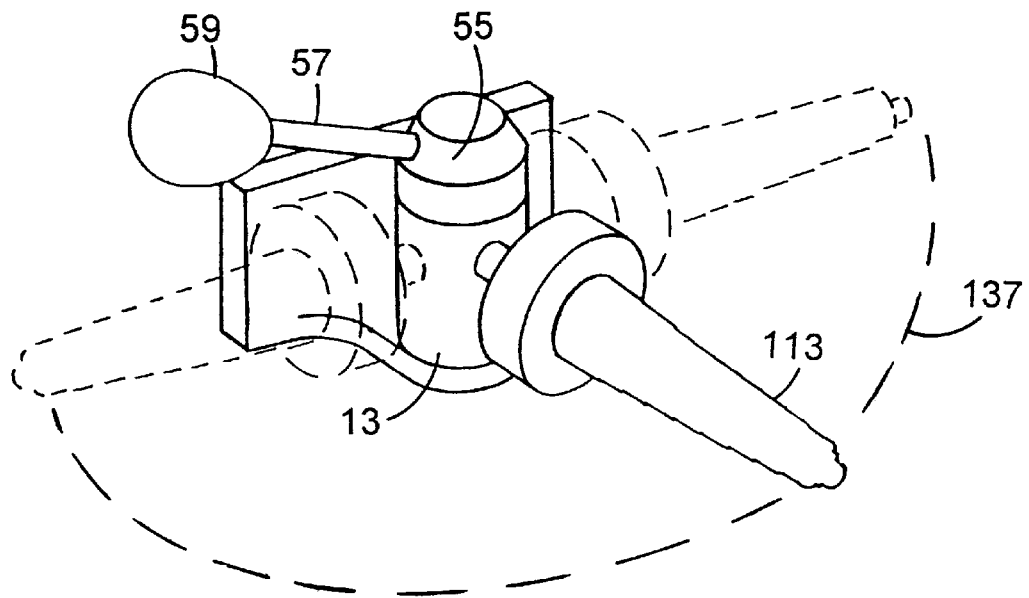
FIG. 3 is a pictorial view of the barrel and arbor shaft mounted in the pivoting section and showing the barrel in phantom in a variety of positions.

Referring now to FIG. 1, the locking ring anvil is seen which includes three main assemblies, namely a frame assembly 11, a pivot assembly 13 and a barrel and arbor assembly 15.

The frame assembly 11 includes a back plate 17 and a support plate 19 which extends at a right angle from the back plate 17. The back plate 17 is preferably a rectangular member and has a front surface 21 and a back surface 23. The back plate 17 has two side edges 25 and a bottom edge 27 and a top edge 31. The support plate 19 extends from the front surface 21 along the bottom edge 27 of the back plate 17 and is located generally midway between the two side edges 25 and generally at right angles to the back plate 17. A hole 33 is located in the support plate 19.

Figure 6:
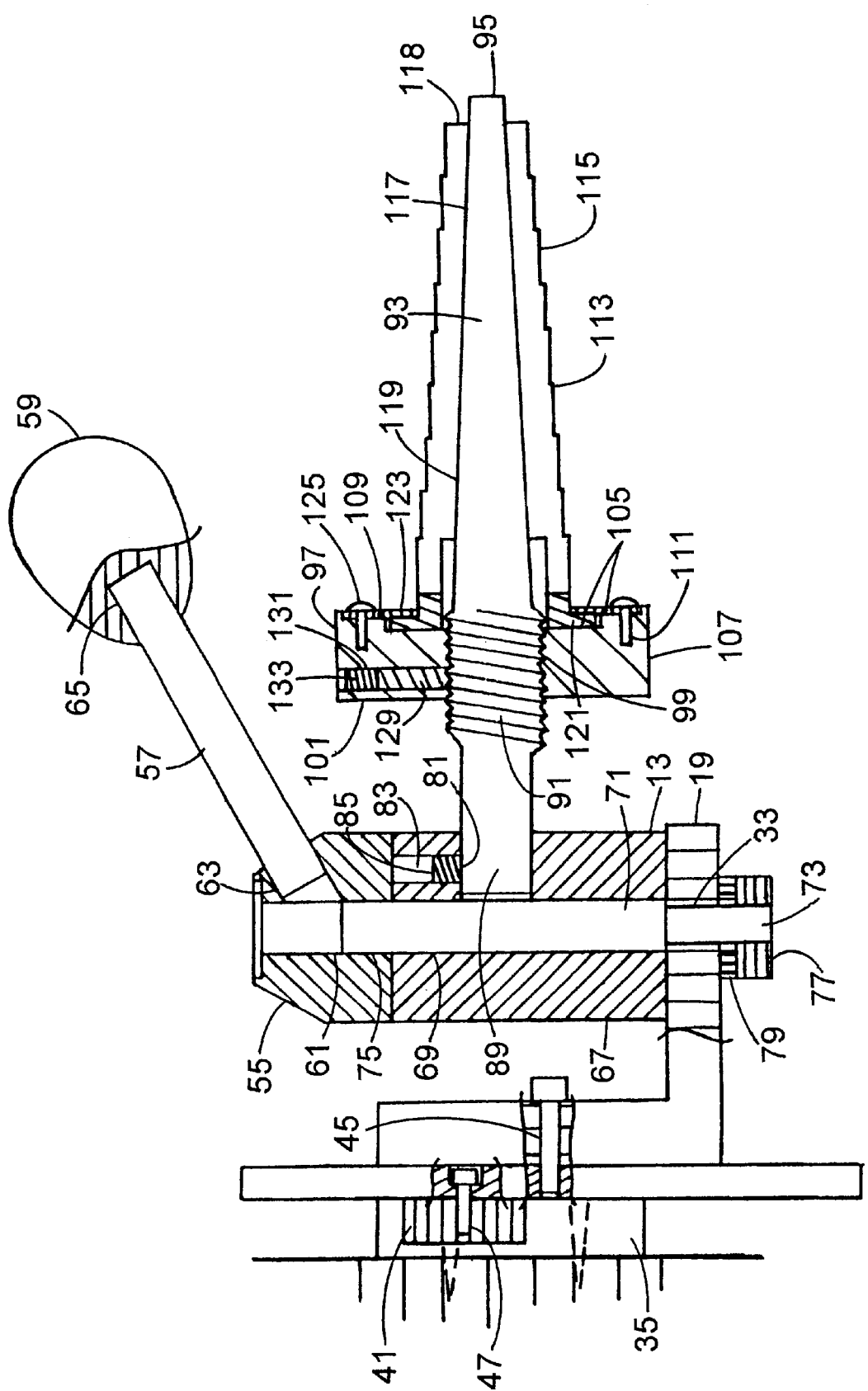
FIG. 6 is a side elevation of the locking ring anvil with the barrel mounted on the adjustment nut and with the adjustment nut mounted on the arbor shaft and also showing the pivot assembly.
Figure 7:
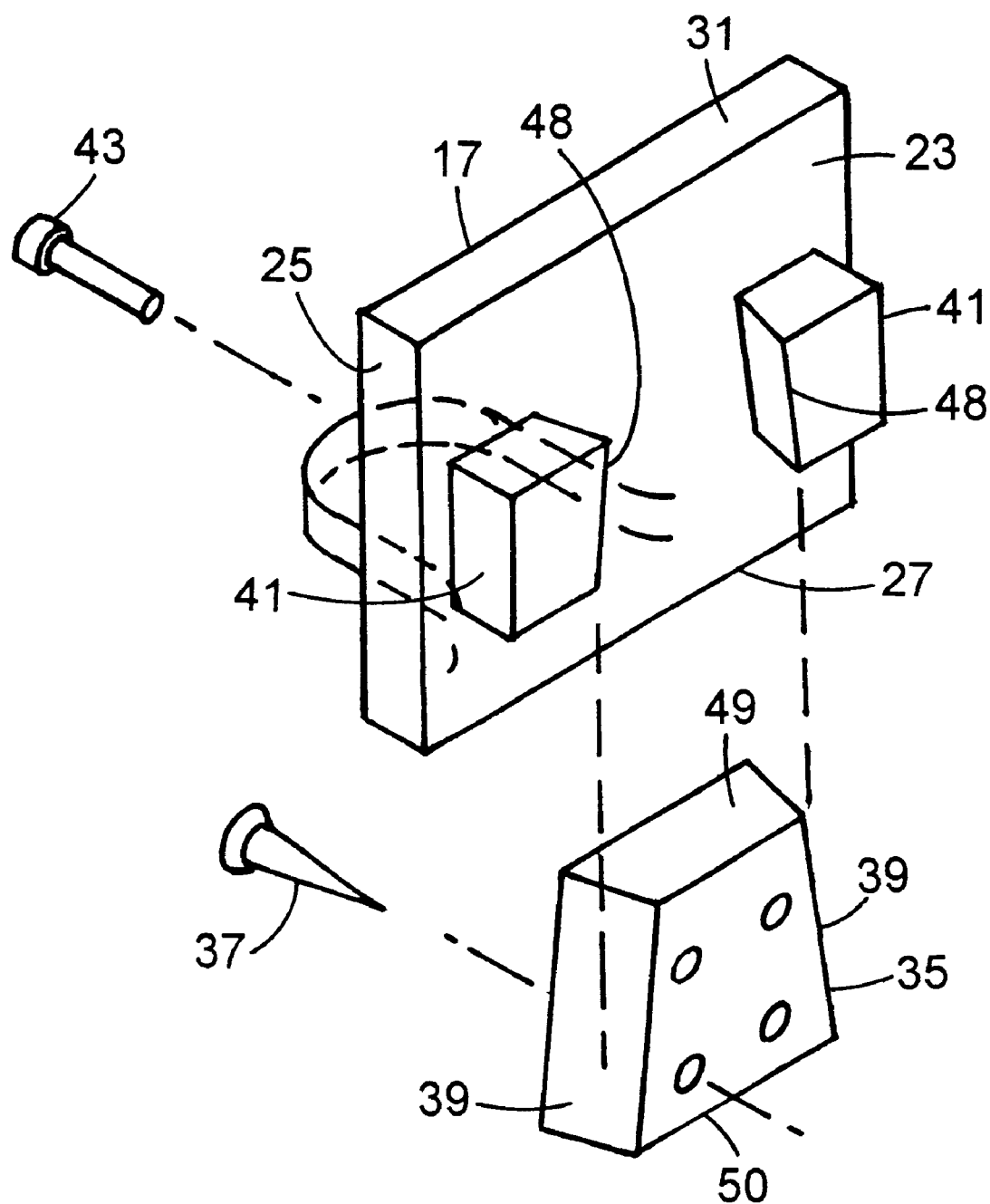
FIG. 7 is a pictorial view of frame showing the back surface of the back plate with the support lugs in place and with the bench plate removed from the back plate.
Figure 9:
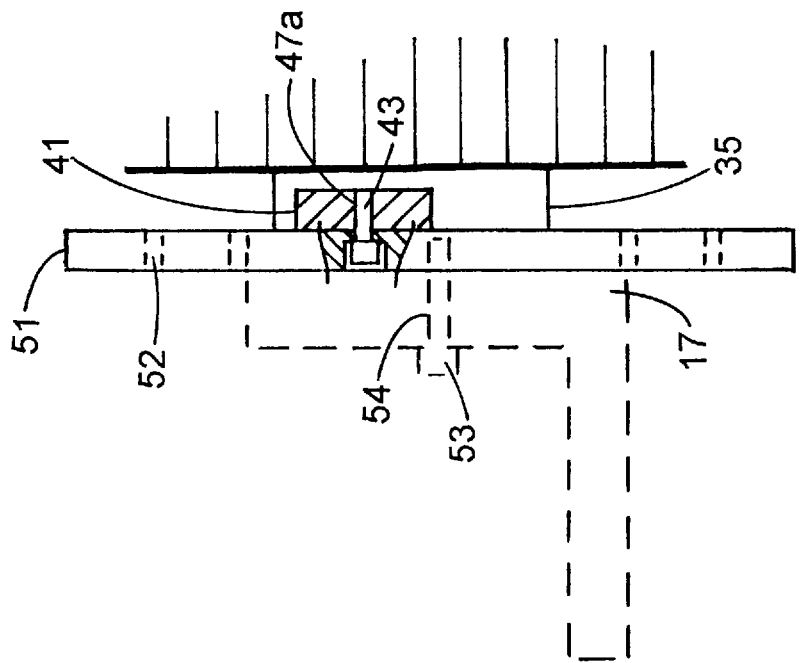
FIG. 9 is a side elevation of the frame on the intermediate plate showing a mounting lug mounted on the intermediate plate of the frame and showing the frame assembly mounted on the intermediate plate.

A bench plate 35, best seen in FIG. 6, FIG. 7 and FIG. 9, is secured to a vertical surface at a work station by multiple screws or bolts 37. Holes are provided for the screws or bolts 37 and the heads of the screws or bolts 37 are recessed. The bench plate 35 has chisel edges 39 along both side edges.

As best seen in FIG. 7, a pair of mounting lugs 41 are affixed to the back surface 23 of the back plate 17. The mounting lugs 41 are affixed by stud bolts 43 screwed into openings 45 in the front surface 21 of the back plate 17 that engage threaded openings 47 in the mounting lugs 41 on the back surface 23. The mounting lugs 41 have sloping edges 48 that generally oppose one another and slope toward the back surface 23 of the back plate 17. The chisel edges 39 of the bench plate 35 engage the sloping edges 48. The bench plate 35 has, besides the two chisel edges, both a top edge 49 and a bottom edge 50. The chisel edges 39 of the bench plate 35 also slope inwardly from the top to bottom resulting in the top edge 49 of the bench plate 35 being shorter than the bottom edge 50. The mounting lugs 41 are tilted to engage the chisel edges 39 resulting in the bench plate 35 locking between the mounting lugs 41 when the mounting lugs 41 are slid over the bench plate 35.

Figure 8:
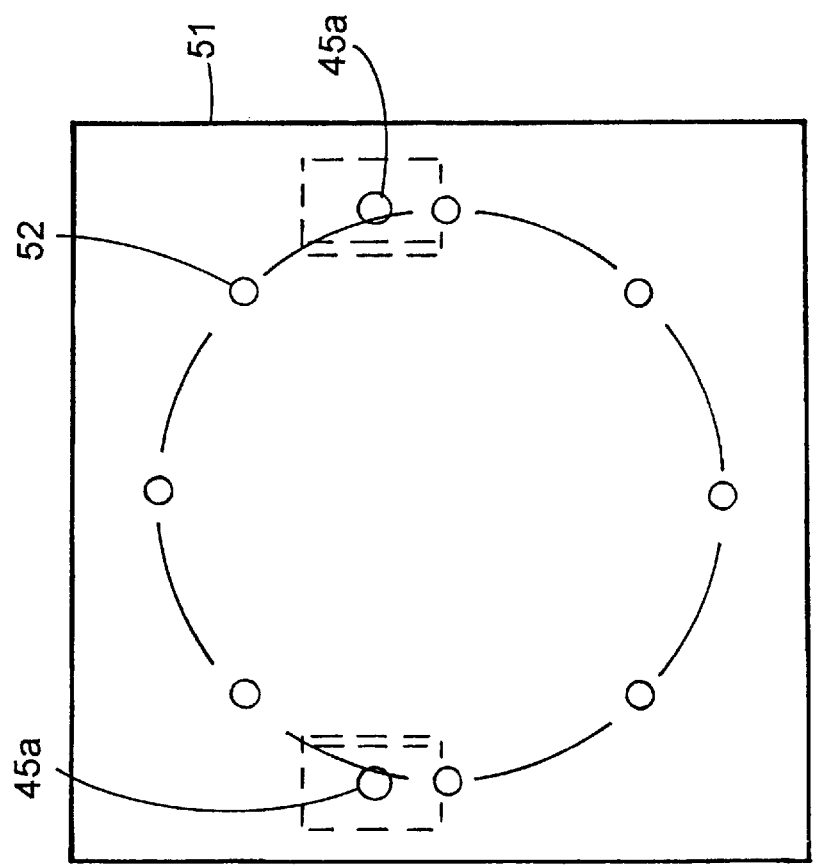
FIG. 8 is a plan view of an intermediate plate which provides an alternate mounting means showing the mounting lugs in place and showing a series of threaded stud holes.

In an alternate embodiment, shown in FIG. 8 and FIG. 9, to permit placement of the locking ring anvil at an angle to the horizontal, an intermediate plate 51 may be used between the bench plate 35 and the back plate 17. A circle of holes 52, that are threaded, are located about the intermediate plate 51. Stud bolts 53, placed through openings 54 in the back plate 17 engage the holes 52 in the intermediate plate 51 and may be placed in any pair of holes 52 depending upon the angular orientation desired for the locking ring anvil. The mounting lugs 41 are placed on the intermediate plate 51 using the stud bolts 43 to engage the threaded openings 47 in the mounting lugs using openings 45a in the intermediate plate 51.

The pivot assembly 13, as is best seen in FIG. 3 and FIG. 6, includes a clamping hub 55 with a handle 57 mounted at its inner end in the clamping hub 55 at an acute angle to the horizontal. A knob 59 is mounted on the outer end of the handle 57. The clamping hub 55 has an opening 61 that is threaded. The handle 57, both ends of which are threaded, is secured to the clamping hub 55 by means of a handle opening 63 which is threaded to engage the inner end of the handle 57.

The pivoting assembly 13 further includes a pivot member 67 which is generally cylindrical and which has an opening 69 extending longitudinally through it. The opening 61 is generally located along the center line of the clamping hub 55 and the opening 69 is generally located along the center line of the pivot member 67.

A pivot stud 71 extends through the opening 69 in the pivot member 67. The pivot stud 71 is a shaft which is threaded at both ends. One end 73 of the pivot stud 71 has a section that has a reduced diameter and is threaded. The end 73, having a reduced diameter, extends though the hole 33 in the support plate 19. The pivot stud 71, except for the end 73 having a reduced diameter, does not fit through the hole 33 in the support plate 19. A thread 75 at the upper end of the pivot stud 71 engages the thread in the opening 61 located in the clamping hub 55. The pivot member 67 is mounted on the pivot stud between the support member and the clamping hub with the pivot stud 71 in the opening 69.

A nut 77 and a locking ring washer 79 are mounted on the end 73 of the pivot stud 71 so as to hold the pivot stud 71 securely on the support plate 19.

By turning the clamping hub 55, the thread in the concentric opening 61 of the clamping hub 55 turns down thereby pressing the pivot member 67 between the clamping hub 55 and the support plate 19. In this way, the pivot member 67 is held in place and cannot rotate on the pivot stud 71. When, however, the clamping hub 55 is turned back, the pivot member 67 is released and the pivot member 67 may be rotated about the pivot stud 71.

The pivot member 67 has a mounting opening 81 in it generally at right angles to the opening 69 in the pivot member 67 and generally midway along the longitudinal axis of the pivot member 67.

A locking opening 83 which is threaded is located generally parallel to the opening 69 in the pivot member 67 and which extends to the mounting opening 81. A set screw 85 is threaded into the locking opening 83.

An arbor shaft 87, best seen in FIG. 2 and FIG. 6 includes an arbor shank 89, a threaded section 91 and a tapered arbor 93. The arbor shank 89 is mounted in the mounting opening 81 and is rigidly secured by the set screw 85. The threaded section 91 is slightly larger that the arbor shank 89. The tapered arbor 93, which extends for the major portion of the arbor shaft 87, is generally conical, the largest diameter being adjacent the threaded section 91. The tapered arbor 93 reduces in diameter from the threaded section 91 to an outside end 95, which is blunt.

An adjustment nut 97, which is preferably knurled on its outside circumference 98, is threaded onto the threaded section 91. The adjustment nut 97 has a generally concentric opening 99 through it which is threaded so as to be compatible to the threaded section 91. The adjustment nut 97, which is cylindrical, has a back surface 101 and a front surface 103. The front surface 103 that faces the tapered arbor 93 is cut out forming a stepped cylindrical recess 105. A deeper recess 107 is located about the concentric opening 99 and a lesser recess 109 extends toward the outside circumference 98. A series of threaded stud openings 111 are formed in the front surface 103 in the lesser recess 109.

A barrel 113, having an outer surface 115 and an inner surface 117, is mounted over the tapered arbor 93. The barrel 113 has a circular cross section and, like the tapered arbor 93, has a circular cross section which, as to the inner surface 117, continuously diminishes to an outer end 118. The outer surface 115 has steps but also diminishes in diameter. The inside end 119 of the barrel 113, has the larger diameter and at the inside end 119 there is a flange 121. The flange 121 fits into the deeper recess 107 of the adjustment nut 97.

A collar 123, which is a flat ring, fits over the flange 121 and into the lesser recess 109 and is held in place by a series of stud bolts 125 which are threaded into the threaded stud openings 111. The flange 121 is thereby held in place but the flange 121, and thus the barrel 113, can rotate in relationship to the adjustment nut 97 unless engaged by the tapered arbor 93.

The barrel 113, in order to be able to expand, is slotted. The slots 127 alternate from a slot 127 extending from the outside end 118 to near the inside end 119 to a slot 127 extending from the inner end 119 to near the outside end 118.

A nylon plug 129 is located in an opening 131 extending from the outside circumference 98 to the concentric opening 99. A set screw 133 is used to press the nylon plug 129 against the threaded section 91 to provide limited turning resistance.

Figure 4:
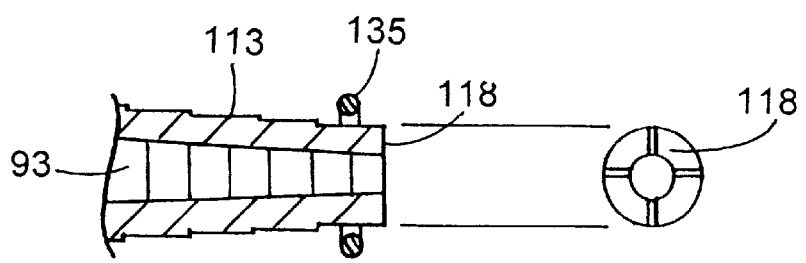
FIG. 4 is a cross-sectional view along the longitudinal axis of the end portions of the arbor shaft and the barrel showing with a ring about the barrel but with the barrel pulled back onto the tapered arbor.
Figure 5:
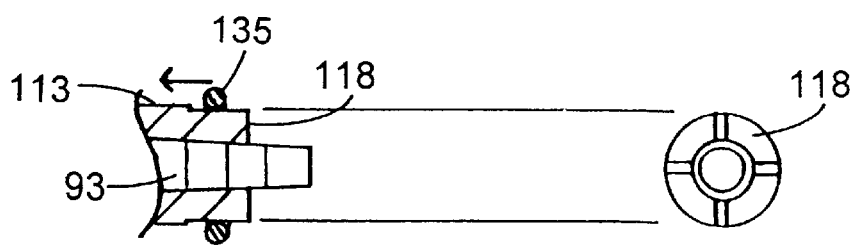
FIG. 5 is a cross-sectional view along the longitudinal axis similar to FIG. 4 but with the barrel pulled back onto the tapered arbor.

In operation, a ring 135 is placed on the barrel 113 at the largest step that will accommodate the ring 135. As best seen in FIG. 4, this is done with the barrel 113 moved outwardly off the tapered barrel 93 thus reducing the diameter of the barrel 113. The adjustment nut 97 is turned to draw the barrel 113 back over the tapered arbor 93. This is best seen in FIG. 5 showing the barrel 113 expanded. The barrel 113 can be rotated on the tapered arbor 93 until the tapered arbor 93 engages the barrel 113 and the barrel 113 is forced outwardly until the outwardly movement of the barrel 113 is restricted by the ring. Then the ring tightens on the barrel 113 and neither the barrel 113 nor the ring can be moved until the adjustment nut is loosened. However, should there be a desire to alter the position of the ring on the barrel 113, a loosening of the adjustment nut 97 will permit the desired movement and then by again tightening the adjustment nut 97, the ring 135 will again be held in its desired position on the barrel 113. It is also possible to tighten the barrel 113 against the ring 135 sufficiently to hold the ring 135 secure but so that the barrel 113 can be turned by hand on the tapered arbor 93.

As best seen in FIG. 3, by loosening the clamping hub 55 by use of the handle 57 and knob 59, the pivot member 67 can rotate thereby permitting the barrel 113 to be swung to any desired position in a semicircle 137. If the intermediate plate 51 is being utilized, the entire locking ring anvil may be rotated, as has been previously explained, and then the plane of rotation of the semicircle is also rotated. In this way, it is even possible to rotate the barrel 113 in a vertical plane.

The adjustment nut 97 is designed for finger sensitivity to avoid damaging a ring. However, if wrench or other means for creating leverage is placed on the adjustment nut 97, the locking ring anvil may be used for expanding a ring but this is not a prime purpose of the locking ring anvil.

Thus, while a preferred embodiment of the invention has been shown and described, it will be apparent to those skilled in the art that many other changes and modifications may be made without departing from the invention in its broader aspects. The appended claims are therefore intended to cover all such changes and modifications as fall within the true spirit and scope of the invention.

What is claimed is:

1. A locking ring anvil comprising:
   a frame assembly;
   means for mounting the frame assembly;
   a pivot assembly mounted on the frame assembly;
   a barrel and arbor assembly mounted on the pivot assembly including means for retaining the barrel and arbor assembly in a fixed position and for rotating the barrel and arbor assembly about a semicircle, the barrel and arbor assembly including a tapered arbor and a barrel and means for mounting the barrel about the tapered arbor to rotate about the tapered arbor and to move the barrel back and forth on the tapered arbor.

2. A locking ring anvil according to claim 1 wherein the frame assembly includes a back plate and a support plate generally located at right angles to the back plate.

3. A locking ring anvil according to claim 1 wherein the frame includes a back plate having a bottom edge and a support plate located at the bottom edge generally at right angles to the back plate.

4. A locking ring anvil according to claim 1 wherein the pivot assembly includes a pivot stud mounted on the frame assembly and having a threaded end remote from the frame assembly and a pivot member mounted to rotate on the frame assembly about the pivot stud, the pivot stud extending beyond the pivot member and a clamping hub mounted on the pivot stud at the threaded end.

5. A locking ring anvil according to claim 1 wherein the adjustment nut includes a front surface, the front surface having a recessed section and wherein the barrel has a flange at the inner end, the flange being mounted in the recesses section and further including a collar to retain the flange within the recess.

6. A locking ring anvil according to claim 1 wherein the adjustment nut has a peripheral surface with an opening extending from the peripheral surface to the inner thread and further includes a nylon plug in the opening and a means for pressing the nylon plug against the threaded section.

7. A locking ring anvil comprising:
   a frame assembly;
   means for mounting the frame assembly;
   a pivot assembly mounted on the frame assembly, the pivot assembly including a pivot member which rotates, the pivot assembly further including a means for fixedly retaining the pivot member to prevent the pivot member from rotating and for releasing the pivot member to rotate;
   an arbor shaft fixedly mounted on the pivot member, the arbor shaft including a tapered arbor and a threaded section, the threaded section being between the tapered arbor and the pivot member;
   an adjustment nut having an inner thread mounted on the threaded section, the inner thread engaging the threaded section; and
   a barrel having an inner end and an outer end and having a circular cross section, the inner end being larger than the outer end, the inner end being mounted on the adjustment nut to rotate in relation to the adjustment nut, the barrel extending over the tapered arbor, the barrel having slots to permit expansion of the barrel.

8. A locking ring anvil according to claim 7 wherein the frame assembly includes a back plate and a support plate generally located at right angles to the back plate.

9. A locking ring anvil according to claim 7 wherein the adjustment nut includes a front surface, the front surface having a recessed section and wherein the barrel has a flange at the inner end, the flange being mounted in the recesses section and further including a collar to retain the flange within the recess.

10. A locking ring anvil according to claim 7 wherein the adjustment nut has a peripheral surface with an opening extending from the peripheral surface to the inner thread and further includes a nylon plug in the opening and a means for pressing the nylon plug against the threaded section.

11. A locking ring anvil comprising:

a frame assembly including a back plate with a bottom edge and a support plate, the support plate being secured to the back plate at the bottom edge;

means for mounting the frame assembly;

a pivot assembly including a pivot stud with an upper end and a lower end, the upper end being threaded, the lower end being secured to the support plate, a pivot member having an opening through it mounted to rotate on the support plate and about the pivot stud, the pivot member further having a mounting opening generally at right angles to the pivot opening, the pivot stud extending beyond the pivot member, a clamping hub having an opening that is threaded and which engages the upper end of the pivot stud being secured to the shank, the pivot stud being mounted in the opening of the pivot member;

an adjustment nut having an inner thread mounted on the threaded section, the inner thread engaging the threaded section; and an arbor shaft including a tapered arbor mounted in the mounting opening of the pivot member;

a barrel having an inner end and an outer end and having a circular cross section, the inner end being larger than the outer end, the inner end being mounted on the adjustment nut to rotate in relation to the adjustment nut, the barrel extending over the tapered arbor, the barrel having slots to permit expansion of the barrel.

12. A locking ring anvil according to claim 11 wherein the adjustment nut includes a front surface, the front surface having a recessed section and wherein the barrel has a flange at the inner end, the flange being mounted in the recesses section and further including a collar to retain the flange within the recess.

13. A locking ring anvil according to claim 11 wherein the adjustment nut has a peripheral surface with an opening extending from the peripheral surface to the inner thread and further includes a nylon plug in the opening and a means for pressing the nylon plug against the threaded section.

14. A locking ring anvil according to claim 11 wherein the means for mounting the frame assembly includes a mounting plate and a pair of lugs on the back plate that engage the mounting plate.

* * * * *